United States Patent
Cheng et al.

(10) Patent No.: US 6,983,872 B2
(45) Date of Patent: Jan. 10, 2006

(54) SUBSTRATE ALIGNMENT METHOD AND APPARATUS

(75) Inventors: Chi Wah Cheng, Tsing Yi (CN); Ping Chun Benson Chong, Kowloon (CN); Chin Pang Anson Chan, Hong Kong (CN)

(73) Assignee: ASM Assembly Automation Ltd., Hong Kong (HK)

( * ) Notice: Subject to any disclaimer, the term of this patent is extended or adjusted under 35 U.S.C. 154(b) by 0 days.

(21) Appl. No.: 10/454,258

(22) Filed: Jun. 3, 2003

(65) Prior Publication Data

US 2004/0245319 A1 Dec. 9, 2004

(51) Int. Cl.
*B23K 13/08* (2006.01)
*B23K 31/12* (2006.01)
*B23Q 15/00* (2006.01)

(52) U.S. Cl. .................. 228/8; 228/9; 228/10; 228/12; 228/102; 228/105

(58) Field of Classification Search ............... 228/8, 228/9, 12, 49.5, 102–105, 180.22, 10
See application file for complete search history.

(56) References Cited

U.S. PATENT DOCUMENTS

| | | | | |
|---|---|---|---|---|
| 5,831,247 A | * | 11/1998 | Hidaka | 219/388 |
| 6,276,590 B1 | * | 8/2001 | Nakazato | 228/41 |
| 6,315,185 B2 | * | 11/2001 | Kajii | 228/8 |
| 6,355,298 B1 | * | 3/2002 | Wah et al. | 427/8 |
| 6,564,991 B1 | * | 5/2003 | Kinoshita | 228/245 |
| 6,575,351 B1 | * | 6/2003 | Kobayashi et al. | 228/207 |
| 6,685,080 B1 | * | 2/2004 | Kee et al. | 228/103 |
| 2004/0253748 A1 | * | 12/2004 | Neo et al. | 438/14 |

* cited by examiner

*Primary Examiner*—Lynne R. Edmondson
(74) *Attorney, Agent, or Firm*—Ostrolenk, Faber, Gerb & Soffen, LLP

(57) ABSTRACT

The invention provides a method and apparatus for aligning a substrate. The apparatus comprises a ball pick head for picking up a plurality of solder balls in a ball pick-up process and depositing them onto the substrate, and a vision system adapted to view and obtain positional information of the substrate. Furthermore, a carrier is provided to which the vision system is mountable, such that operation of the vision system is decoupled from movement of the ball pick head. Drivers responsive to said positional information viewed by the vision system are operative to align at least the substrate and the ball pick head for depositing solder balls onto the substrate.

16 Claims, 4 Drawing Sheets

SUBSTRATE ALIGNMENT METHOD AND APPARATUS

FIELD OF THE INVENTION

The invention relates to a method and apparatus for aligning a semiconductor substrate, in particular, for aligning the substrate when undergoing a semiconductor assembly process, such as during placement of solder balls onto the substrate's contact pads.

BACKGROUND AND PRIOR ART

Ball Grid Array ("BGA") techniques are commonly used for producing high-density integrated circuit ("IC") components. A regular array of solder balls is deposited onto the IC component at contact pads where the electrical contacts of the IC component are to be formed. Such balls forming the electrical contacts of the IC component may then be mated with corresponding connections on a printed circuit board in use.

During production using BGA techniques, droplets of flux and solder balls must be transferred to a substrate where they are deposited in a predetermined array. A common technique is to use a flux transfer head or pin head to transfer flux to the substrate and a ball pick head to carry solder balls in the same array configuration as is required on the substrate, and then subsequently to deposit balls onto the substrate containing flux. It is usually essential that all the electrical contact points of the IC component are covered by solder balls to ensure that the component is not defective. Conventionally, the ball pick head is formed with a plurality of locations for receiving solder balls, these locations being disposed in the same array configuration as the desired configuration of solder balls on the circuit board. The corresponding pin head must also deposit flux droplets in the same array configuration on the substrate.

A number of challenges are presented to the design of fast and efficient apparatus for the placement of flux droplets and solder balls. The apparatus must be designed so that the pin head and the ball pick head are brought in turn to a precise position over the substrate and since the dimensions of the array and in particular the spacing between solder ball locations on the array are small, accurate alignment techniques must be employed. Generally, a vision or pattern recognition system such as a camera is used to locate and capture images of at least two fiducial markers on the substrate to determine whether any degree of movement is required to achieve alignment with the substrate.

The need in a production process to accurately align pin heads and ball pick heads over the substrate in a high-speed and efficient manner has given rise to the use of two cameras to reduce the movement that might be required by a single camera having to travel between the fiducial markers. An example is U.S. Pat. No. 6,070,783 in respect of a "Conductive Ball Attaching Apparatus and Method". An apparatus is described wherein two alignment cameras are diagonally positioned from each other and integrated to a main transfer means. The problem is that the main transfer means is involved in many process work elements, such as ball pick-up, flux transfer, alignment and ball placement on the substrate. Moreover, the apparatus has a large transfer means design, such that the individual transfer means need to travel a relatively long distance to complete one cycle, resulting in a longer alignment and ball placement process. Another feature of the apparatus is that the cameras are rigidly integrated with the transfer means, such that movement of the cameras is dependent on movement of the transfer means. This makes the system more cumbersome and complex.

Another example of an apparatus using two cameras to align a substrate is U.S. Pat. No. 6,355,298 for a "Placement System Apparatus and Method". One alignment camera is mounted on a pin head and another camera is mounted on a ball pick head. The ball pick head is involved in a time-critical process and has a higher number of process work elements as compared with the pin head. The result is an unequal distribution of work-loading since the ball pick head takes a significantly longer time to complete its processes as compared to the pin head. The ball pick head is not able to perform simultaneously a ball pick-up process (which includes ball preparation into a predetermined array for pick-up) and substrate alignment. This is because the ball pick head needs to wait for the processed substrate to exit the ball mounting station and a new substrate to enter for alignment, before it can perform ball preparation for another substrate. The waiting time contributes to increased process cycle time.

SUMMARY OF THE INVENTION

It is an objective of the invention to avoid some of the disadvantages of the prior art in order to develop a relative more efficient method and apparatus for substrate alignment.

According to a first aspect of the invention, there is provided an apparatus for aligning a substrate comprising: a ball pick head for picking up a plurality of solder balls in a ball pick-up process and depositing them onto the substrate; a vision system adapted to view and obtain positional information of the substrate; a carrier to which the vision system is mountable, such that operation of the vision system is decoupled from movement of the ball pick head; and drivers responsive to said positional information viewed by the vision system to align at least the substrate and the ball pick head for depositing solder balls onto the substrate.

According to a second aspect of the invention, there is provided a method for aligning a substrate comprising the steps of: providing a ball pick head for picking up a plurality of solder balls in a ball pick-up process and depositing them onto the substrate; viewing and obtaining positional information of the substrate with a vision system mounted to a carrier, thereby decoupling operation of the vision system from movement of the ball pick head; and aligning at least the substrate and the ball pick head in response to said positional information to deposit solder balls onto the substrate.

It will be convenient to hereinafter describe the invention in greater detail by reference to the accompanying drawings which illustrate one embodiment of the invention. The particularity of the drawings and the related description is not to be understood as superseding the generality of the broad identification of the invention as defined by the claims.

BRIEF DESCRIPTION OF THE DRAWINGS

Embodiments of a method and apparatus in accordance with the invention will now be described with reference to the accompanying drawings, in which.

DETAILED DESCRIPTION OF THE PREFERRED EMBODIMENTS

Figure 1:
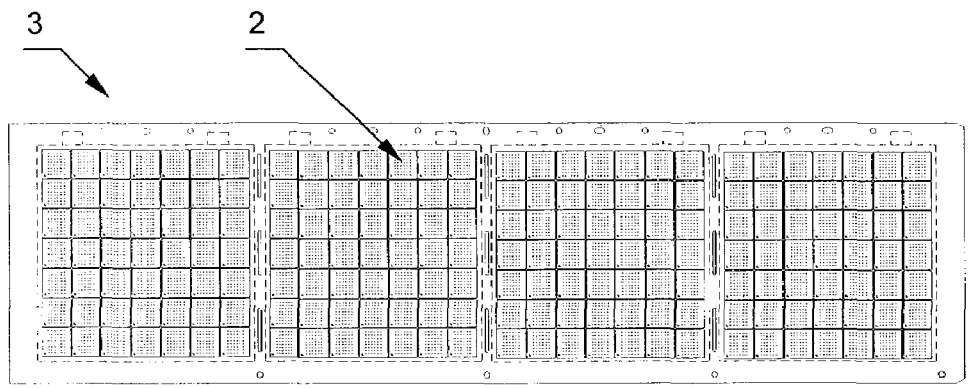
FIG. 1 is a plan view of a typical BGA substrate with rectangular arrays of conductive solder pads.

FIG. 1 is a plan view of a typical BGA substrate 3 with rectangular arrays of conductive solder pads 2. Flux and solder balls must be accurately placed at the locations of the solder pads 2.

Figure 2:
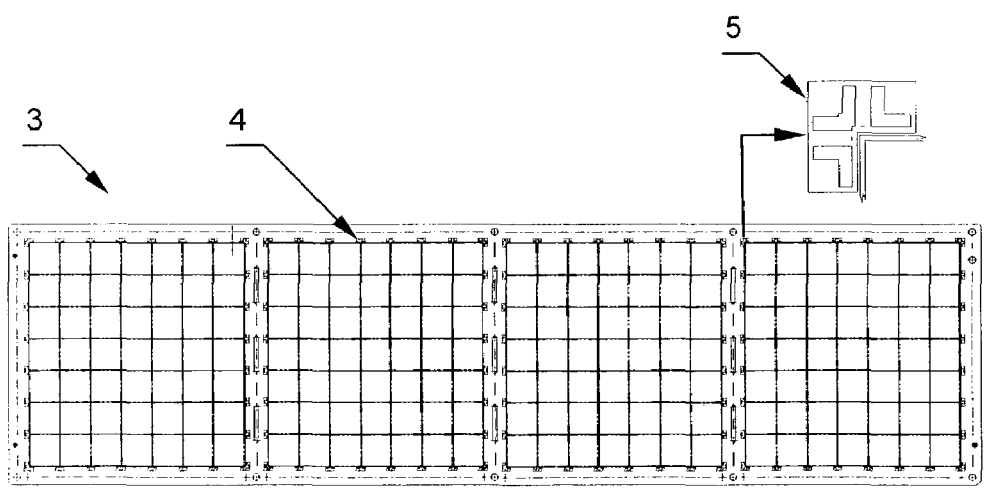
FIG. 2 is a plan view of the BGA substrate with its fiducial marks more clearly illustrated.

FIG. 2 is a plan view of the BGA substrate with its fiducial marks more clearly illustrated. Illustrations of the solder pads 2 have been removed for clarity.

The substrate 3 has a number of lines defining grids 4 corresponding to outlines of the arrays of conductive solder pads 2. These grids 4 include a number of fiducial marks 5. An enlarged view of a fiducial mark 5 of a predetermined design is shown. In FIG. 2, the design of the fiducial mark 5 comprises regular L-shaped blocks, but it would be appreciated that other designs are also possible.

Figure 3:
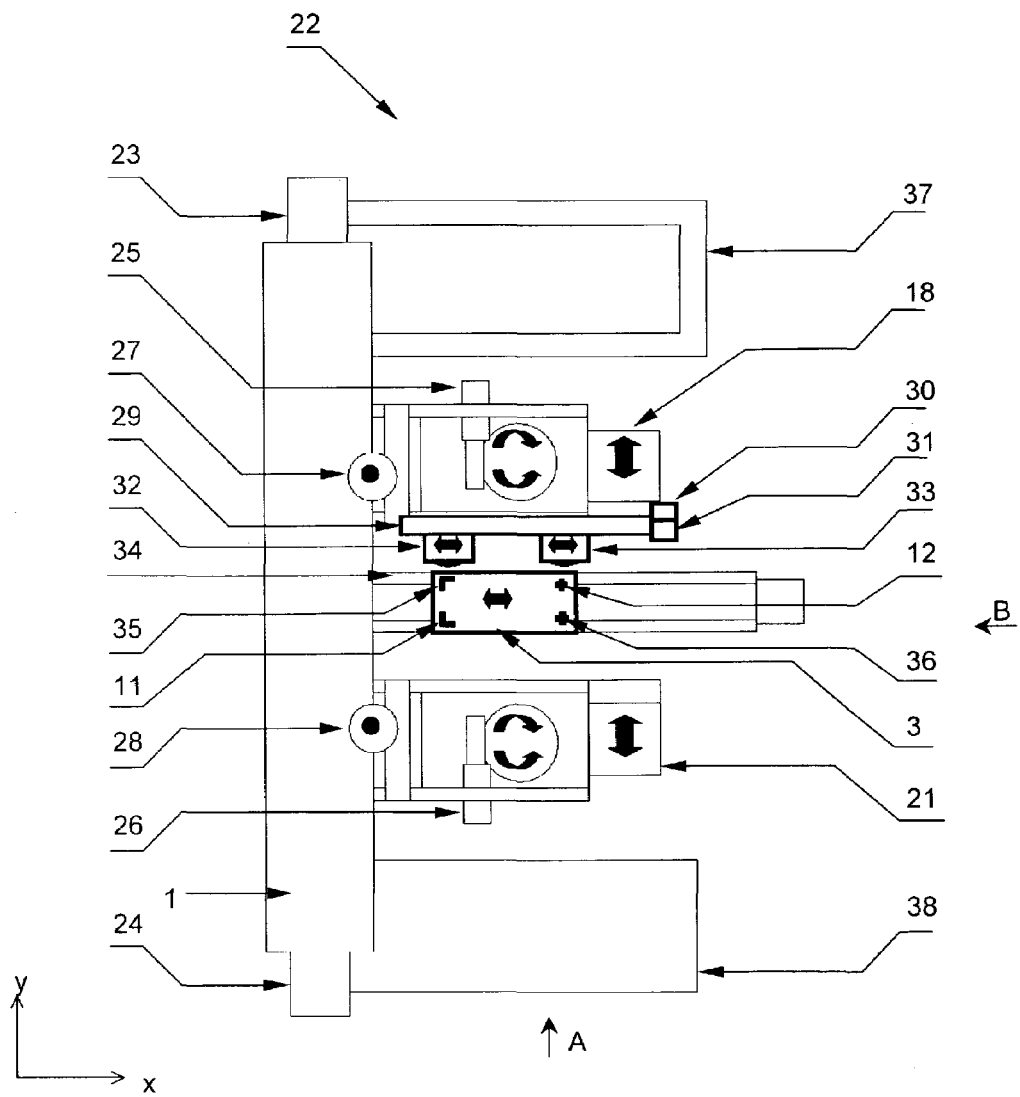
FIG. 3 is a plan view of a substrate alignment and ball placement device according to the preferred embodiment of the invention.

FIG. 3 is a plan view of a substrate alignment and ball placement device 22 according to the preferred embodiment of the invention. The ball placement device 22 comprises generally of a support frame 1 supporting a flux transfer head or pin head 18, and a ball pick head 21. The ball placement device 22 includes a number of drivers or motors. A pin head y-motor 23 attached to the support frame 1 drives the pin head 18 along a y-axis, whereas a ball pick head y-motor 24 attached to the support frame 1 drives the ball pick head 21 along the y-axis. Further, a pin head z-motor 27 and a ball pick head z-motor 28 drive the pin head 18 and ball pick head 21 respectively in the z-axis (i.e. perpendicular to the x- and y-axes). The pin head motors 23, 27 and ball pick head motors 24, 28 are mounted onto the support frame 1. There is also a separate module that has a horizontal rail with a ball/flux mounting platform 34 and is used for flux and ball placement, and substrate transport in the x-axis.

With respect to the pin head 18, it includes a pin head theta motor 25 that drives angular rotation of the pin head 18. The pin head 18 also includes a vision system, which may be in the form of a dual camera alignment module 29. Thus, the pin head 18 acts as a carrier to which the vision system is mounted. The vision system or dual camera alignment module 29 is adapted to view and obtain positional information of the substrate 3. In the preferred embodiment, the vision system comprises a first camera 32 and a second camera 33. Camera motors 30, 31 drive the first and second cameras 32, 33 respectively along linear guides 42 (see FIG. 4) in the x-axis in the dual camera alignment module 29.

With respect to the ball pick head 21, it further comprises a ball pick head theta motor 26 to drive angular rotation of the ball pick head 21. The ball pick head 21 picks up a plurality of solder balls in a ball pick-up process and deposits them onto a substrate 3 located on the ball/flux mounting platform 34 of the horizontal rail. The substrate 3 typically contains positional indicia, such as fiducial marks 11, 12, 35 and 36. Typically, fiducial marks are read horizontally or diagonally as pairs to determine alignment of a substrate, such that fiducial mark 11 may be read simultaneously with fiducial mark 12 and fiducial mark 35 may be read simultaneously with fiducial mark 36. Other than fiducial marks 12, the device 22 can be programmed to recognize other positional indicia, such as conductive pads, solder pads or any other unique recognition marks on the surface of the substrate 3.

At each end of the shaft, there is a flux reservoir 37 and a ball template holder 38 respectively. It should be appreciated that although one camera is sufficient for implementing the invention, two cameras are generally preferred as they may stay in relatively fixed positions in the x-axis for viewing successive substrates, provided that they do not physically obstruct each other during pattern recognition. By doing so, alignment time can be shortened. It should also be appreciated that the various motors 23–28, 30–31 act as drivers to control relative positions of the various components of the ball placement device 22 to align at least the substrate 3 and the ball pick head 21, as well as the substrate 3 and pin head 18 in the described embodiments, for depositing solder balls 48 onto the substrate 3.

Figure 4:
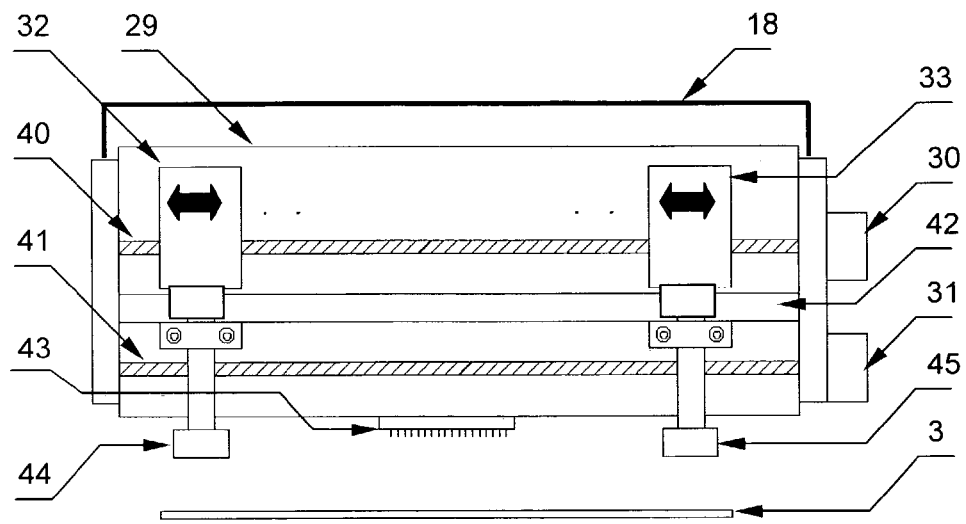
FIG. 4 is an elevational view of dual alignment cameras mounted on a pin head of the ball placing device according to one preferred embodiment looking from direction A of FIG. 3.

FIG. 4 is an elevational view of the dual camera alignment module 29 mounted on the pin head 18 of the ball placement device 22 according to one preferred embodiment looking from direction A of FIG. 3. The camera module 29 is a modular assembly on which the first and second cameras 32, 33 are mounted. The pin head 18 is selected for mounting the camera module 29 as it is a relatively non time-critical process head, i.e. it executes fewer process work elements, as compared to the ball pick head 21.

The first camera 32 and second camera 33 are capable of independent movement in the x-axis. There is an LED module 44, 45 for each camera 32, 33. A linear guide 42 serves as a conduit to allow horizontal movement of the cameras 32, 33 and to position them with respect to the pin head 18 to view fiducial marks 11, 12, 35, 36 on the surface of the substrate 3. There may be a linear guide 42 for each camera 32, 33 or a single linear guide 42 may be shared. The cameras 32, 33 are preferably placed adjacent to each other, although it is also possible to position them on different sides of the carrier or pin head 18. A first feed screw 40 driven by the first camera motor 30 controls the motion of the first camera 32 whereas a second feed screw 41 driven by the second camera motor 31 controls the motion of the second camera 33.

Also illustrated are flux transfer pins 43 on the underside of the pin head 18 that are adapted to collect flux, then contact a substrate 3 to apply flux to it.

Figure 5:
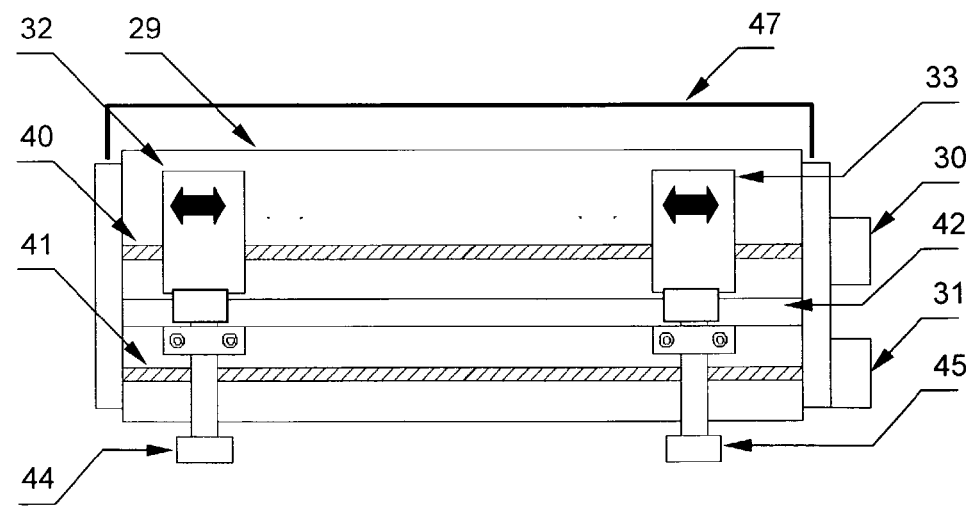
FIG. 5 is an elevational view of dual alignment cameras mounted on a non-process head according to another preferred embodiment.

FIG. 5 is an elevational view of the dual camera alignment module 29 mounted on a non-process head 47 according to another preferred embodiment. The non-process head 47 acts as a carrier for the vision system in this embodiment. The configuration is the same as that of FIG. 4, except that the non-process head 47 is not involved in any time-critical process or any function other than supporting and positioning the cameras 32, 33. The essence of the first and second embodiments is that the vision system or dual camera alignment module 29 is adapted to obtain positional information of the substrate 3 substantially simultaneously with the ball pick head 21 undergoing the ball pick-up process (the ball pick-up process includes ball preparation into a predetermined array for pick-up). This can be done by decoupling operation of the vision system from movement of the ball pick head 21. In this case, the non-process head 47 may be positioned such that fiducial marks 11, 12, 35, 36 of the substrate 3 can be viewed without extensive movement by the non-process head 47. The ability of the non-process head 47 to move in the y-axis would be desirable.

FIGS. 6A to 6F illustrates an operation sequence illustrating a distribution of process work elements between the pin head 18 and ball pick head 21 according to the preferred embodiment of the invention. The configuration is shown generally looking from direction B of FIG. 3.

Figure 6A:
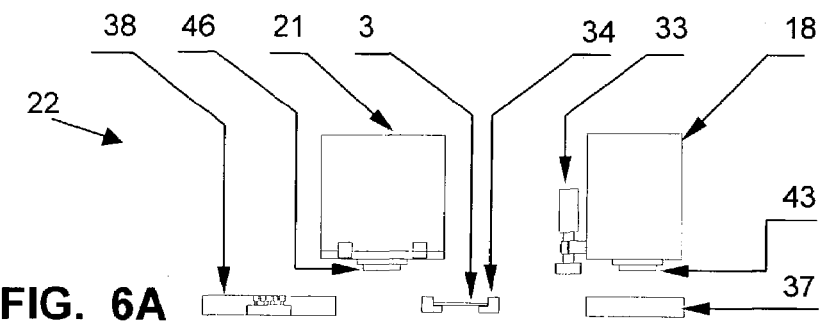
FIGS. 6A to 6F illustrates an operation sequence illustrating a distribution of process work elements between the pin head and ball pick head according to the preferred embodiment of the invention.

FIG. 6A shows the ball placement device 22 in a standby position. The substrate 3 is placed and accommodated on the ball/flux mounting platform 34 of the horizontal rail. The pin head 18, that has flux transfer pins 43 and cameras 32, 33 attached to it, is positioned over the flux reservoir 37. The ball pick head 21, that has a pick head template 46, is positioned between the ball template holder 38 and the substrate 3.

Figure 6B:
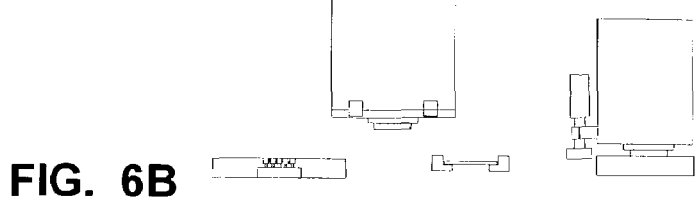

In FIG. 6B, the pin head 18 with fluxed pins is lowered so that the transfer pins 43 are dipped to a predetermined depth into the flux reservoir 37 to collect flux.

Figure 6C:
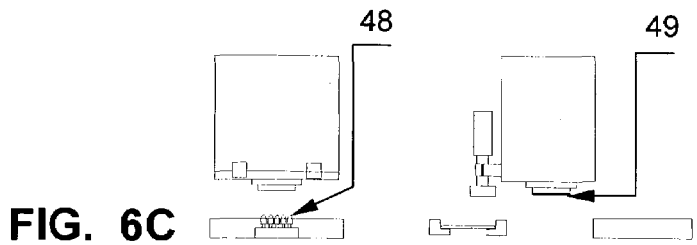

In FIG. 6C, the pin head 18 is raised and is moved towards the substrate 3 with a layer of flux 49 collected on the flux transfer pins 43. Concurrently, solder balls 48 are introduced onto the ball template holder 38 during a ball preparation stage of the ball pick-up process. The ball template holder 38 has recesses that are arranged in the same configuration as solder pads on the substrate 3. Therefore, the solder balls 48 that are arranged on the recesses are ready to be picked up and placed onto corresponding positions on the substrate 3. The ball pick head 21 is now positioned over the ball template holder 38 to pick up the solder balls.

As the pin head 18 is moved towards the substrate 3 with the cameras 32, 33 mounted on it, the cameras 32, 33 will search for and then be positioned over fiducial marks 11, 12, 35, 36 of the substrate 3. As mentioned above, the fiducial marks are read in pairs. Thus, taking diagonally-located fiducial marks 11 and 12 as an example (see FIG. 3), the second camera 33 is positioned over fiducial mark 12 to obtain an image of the fiducial mark 12 and the first camera 32 is positioned over fiducial mark 11 to obtain an image of the fiducial mark 11. A combination of the relative positions of the two fiducial marks 11, 12 allows the ball placement device 22 to determine the extent to which the flux transfer pins 43 of the pin head 18 and the pick head template 46 of the ball pick head 21 are out of alignment with the orientation of the substrate 3. The pin head motors 23, 25 and ball pick head motors 24, 26 of the pin head 18 and ball pick head 21 respectively are then capable of adjusting the orientations of the components accordingly in the y and theta axes to correspond with the orientation of the substrate 3 when being positioned over the substrate 3. Compensation in the x-axis may be provided by movement of the ball/flux mounting platform 34 on the horizontal rail, or in another embodiment (not shown), movement in the x-axis of the pin head 18 and ball pick head 21, if the pin head 18 and ball pick head 21 are so designed to travel along the x-axis.

If the fiducial marks 11, 12, 35, 36 are wide enough such that the two cameras do not physically obstruct each other during pattern recognition, a relatively shorter alignment time is necessary. The cameras 32, 33 may even stay in relatively fixed positions in the x-axis for viewing successive substrates. However, if the distance between reference fiducial marks 11, 12, 35, 36 is small, it may be necessary for the cameras 32, 33 to give way to each other during pattern recognition.

Figure 6D:
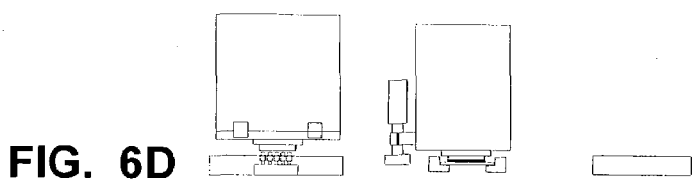

In FIG. 6D, the flux transfer pins 43 have been aligned with the solder pads of the substrate 3 and are lowered to transfer flux onto the substrate 3. At the same time, the pick head template 46 is lowered to pick up solder balls 48 in the next stage of the ball pick-up process, usually by vacuum suction means.

Figure 6E:
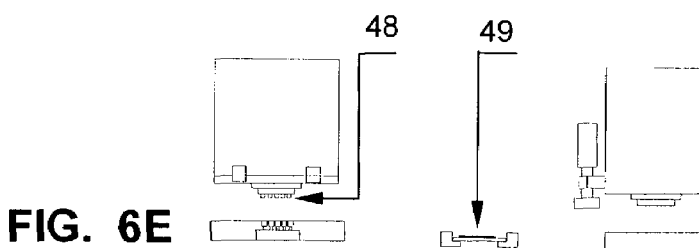

In FIG. 6E, the pin head 18 has deposited a layer of flux 49 onto the substrate 3 and is moved back to its standby position. The ball pick head 21 has been raised, and its y and theta motors 24, 26 bring it into alignment with the orientation of the substrate 3.

Figure 6F:
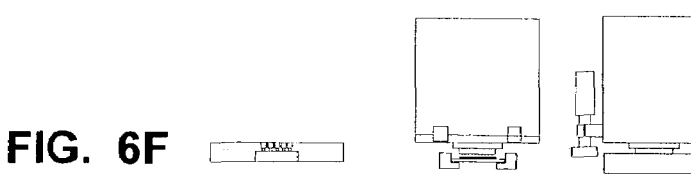

In FIG. 6F, the solder balls 48 are placed onto the substrate 3 on which has been deposited a layer of flux 49. The flux 49 helps the solder balls 48 to adhere onto the substrate 3. At this time, the pin head 18 is lowered into the flux reservoir 37 again to collect another layer of flux 49. Thereafter, the ball pick head 21 is raised after releasing the solder balls 48 and the substrate 3 is removed from the ball placement device 22. Another placement cycle is started.

By shortening alignment time, system cycle time for solder ball placement may be shortened. As the cameras do not need to travel frequently or need to travel relatively shorter distances, potential wear problems on mechanical parts can be minimized with the reduced movement. There is further a possibility of the dual alignment cameras remaining in relatively fixed positions in the x-axis if the distance between fiducial marks is sufficiently large. With the layout according to the described embodiments, a time critical process head such as a ball pick head can focus on its task and share alignment information collected by a camera mounted to a less critical process head such as a pin head or a non-process head. As a result, the more balanced load distribution of the respective heads lead to reduced alignment time.

The invention described herein is susceptible to variations, modifications and/or additions other than those specifically described and it is to be understood that the invention includes all such variations, modifications and/or additions which fall within the spirit and scope of the above description.

What is claimed is:

1. Apparatus for aligning a substrate comprising:
   a ball pick head for picking up a plurality of solder balls in a ball pick-up process and depositing them onto the substrate;
   a vision system adapted to view the substrate and to obtain positional information in accordance with a position of the substrate;
   a carrier including a flux transfer head for collecting and depositing flux onto the substrate, the vision system being mounted to the carrier such that operation of the vision system is decoupled from movement of the ball pick head; and
   drivers responsive to said positional information obtained by the vision system to align at least the substrate and the ball pick head for depositing the solder balls onto the substrate;
   wherein the vision system comprises a first camera that is movable along a linear guide for positioning the first camera with respect to the carrier to view positional indicia on a surface of the substrate and further comprising a second camera movable along a linear guide substantially independently of the first camera, such that the first and second cameras cooperate to view the positional indicia at different positions on the surface of the substrate.

2. Apparatus according to claim 1, wherein the vision system is adapted to obtain the positional information substantially simultaneously with the ball pick head undergoing the ball pick-up process.

3. Apparatus according to claim 1, wherein the positional indicia include indicia selected from the group consisting of fiducial marks, conductive pads and solder pads.

4. Apparatus according to claim 1, wherein the second camera is arranged substantially adjacent to the first camera.

5. Apparatus according to claim 1, wherein the first and second cameras are maintained at fixed positions relative to each other for viewing consecutive substrates.

6. Apparatus according to claim 1, wherein the drivers are operative to move the ball pick head along a first axis towards and away from the position of the substrate, and to move the ball pick head into angular alignment with the substrate.

7. Apparatus according to claim 6, wherein the substrate lies in a plane, and the drivers are operative to move the substrate along a second axis parallel to the plane in which the substrate lies and perpendicular to the first axis.

8. Apparatus according to claim 6, wherein the substrate lies in a plane, and the drivers are adapted to move the ball pick head and carrier along a second axis parallel to the plane in which the substrate lies and perpendicular to the first axis.

9. Method for aligning a substrate comprising the steps of:
providing a ball pick head for picking up a plurality of solder balls in a ball pick-up process and depositing the solder balls onto the substrate;
viewing the substrate and obtaining positional information in accordance with a position of the substrate using a vision system mounted to a carrier including a flux transfer head for collecting and depositing flux onto the substrate, such that operation of the vision system is decoupled from movement of the ball pick head; and
aligning at least the substrate and the ball pick head in response to the positional information to deposit the solder balls onto the substrate;
wherein the vision system comprises a first camera that is movable along a linear guide for positioning the first camera with respect to the carrier to view positional indicia on a surface of the substrate and further comprises a second camera movable along a linear guide substantially independently of the first camera, such that the first and second cameras cooperate to view positional indicia at different positions on the surface of the substrate.

10. Method according to claim 9, wherein the vision system obtains the positional information substantially simultaneously with the ball pick head undergoing the ball pick-up process.

11. Method according to claim 9, wherein the positional indicia include indicia selected from the group consisting of fiducial marks, conductive pads and solder pads.

12. Method according to claim 9, further comprising arranging the second camera substantially adjacent to the first camera.

13. Method according to claim 9, further comprising maintaining the first and second cameras at fixed positions relative to each other for viewing consecutive substrates.

14. Method according to claim 9, further comprising moving the ball pick head along a first axis towards and away from the position of the substrate, and moving the ball pick head into angular alignment with the substrate during the aligning step.

15. Method according to claim 14, wherein the substrate lies in a plane, the method further comprising moving the substrate along a second axis parallel to the plane within which the substrate lies and perpendicular to the first axis.

16. Method according to claim 14, wherein the substrate lies in a plane, the method further comprising moving the ball pick head along a second axis parallel to the plane within which the substrate lies and perpendicular to the first axis.

* * * * *